(12) United States Patent
Bryant

(10) Patent No.: US 7,073,978 B2
(45) Date of Patent: Jul. 11, 2006

(54) LIGHTWEIGHT CATENARY SYSTEM

(75) Inventor: Michael J. Bryant, Dundee (GB)

(73) Assignee: Deepflex, Inc., Houston, TX (US)

( * ) Notice: Subject to any disclaimer, the term of this patent is extended or adjusted under 35 U.S.C. 154(b) by 0 days.

(21) Appl. No.: 10/918,843

(22) Filed: Aug. 16, 2004

(65) Prior Publication Data

US 2006/0034665 A1    Feb. 16, 2006

(51) Int. Cl.
*F16L 1/20* (2006.01)

(52) U.S. Cl. ........................... 405/172; 405/171

(58) Field of Classification Search ............ 405/172, 405/171, 223.1, 224.2, 224.3; 166/350
See application file for complete search history.

(56) References Cited

U.S. PATENT DOCUMENTS

| | | | |
|---|---|---|---|
| 2,373,439 A * | 4/1945 | Wheatley | 405/172 |
| 3,111,926 A | 11/1963 | Shattoo, Jr. | |
| 3,477,474 A | 11/1969 | Mesler | |
| 3,583,169 A * | 6/1971 | Morgan | 405/171 |
| 4,063,430 A * | 12/1977 | Lamy | 405/172 |
| 4,556,340 A * | 12/1985 | Morton | 405/224.2 |
| 4,606,378 A * | 8/1986 | Meyer | 405/171 |
| 4,735,267 A * | 4/1988 | Stevens | 166/350 |
| 5,984,581 A * | 11/1999 | McGill et al. | 405/172 |
| 6,109,834 A * | 8/2000 | Chitwood | 405/223.1 |
| 6,146,052 A * | 11/2000 | Jacobsen et al. | 405/169 |
| 6,364,022 B1 * | 4/2002 | Kodaissi et al. | 405/224.3 |
| 6,491,779 B1 * | 12/2002 | Bryant | 156/192 |
| 6,663,453 B1 * | 12/2003 | Quigley et al. | 405/171 |
| 6,682,266 B1 * | 1/2004 | Karal et al. | 166/350 |
| 6,764,365 B1 * | 7/2004 | Quigley et al. | 405/171 |

* cited by examiner

*Primary Examiner*—Frederick L. Lagman
(74) *Attorney, Agent, or Firm*—B. R. Pravel; James W. Pravel

(57) ABSTRACT

A lightweight catenary system for deepsea operations in which a lightweight flexible pipe such as disclosed in U.S. Pat. No. 6,491,779 is suspended in seawater from a vessel or platform, and having a positive or nearly positive buoyancy, and which is stabilized by disposing weight in proximity to or attached to the lower portion of the pipe at or near the seabed, whereby the weight and costs of supporting heavy pipe in offshore operations is reduced or eliminated.

10 Claims, 1 Drawing Sheet

LIGHTWEIGHT CATENARY SYSTEM

CROSS-REFERENCE TO RELATED APPLICATIONS

Not applicable.

STATEMENTS REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The field of the invention is lightweight flexible pipe catenary systems for deep sea installations.

2. Description of the Related Art

U. S. Pat. No. 6,491,779B1 discloses a flexible pipe made of lightweight composite materials for subsea use. Prior to the invention of said U.S. Pat. No. 6,491,779B1, it was generally known that relatively heavy pipe, usually steel, for subsea use formed a catenary when disposed in seawater from a vessel on the water's surface to the seabed. Such prior systems require the users to provide expensive equipment at the surface or elsewhere to offset the large weight of the steel pipe. In spite of the cost of supporting the weight of the pipe in seawater in the past, the industry has continued to use such heavy pipe with the problems resulting from the weight of the pipe.

Also, prior art flexible non-metallic hoses for use in water depths which are greater than about one-thousand feet could not have been used in this invention, because they would have collapsed to a closed inoperative condition by the seawater pressure at those depths.

BRIEF SUMMARY OF THE INVENTION

With the present invention, using the lightweight flexible pipe, such as disclosed in U.S. Pat. No. 6,491,779, the catenaries formed when the pipe is submerged from a vessel or platform have a positive buoyancy, or a substantially reduced weight, compared to the prior art, which significantly reduces the cost for supporting the pipe when suspended in subsea uses.

Thus, with the lightweight catenary system of this invention a flexible pipe with an upward buoyancy of the pipe when submerged in seawater, some weight is applied to the lower portion of the flexible pipe in an amount which is sufficient to provide resistance to the floatation of the flexible pipe, which thereby stabilizes the pipe in such catenary configuration.

DETAILED DESCRIPTION OF THE INVENTION

Figure 1:
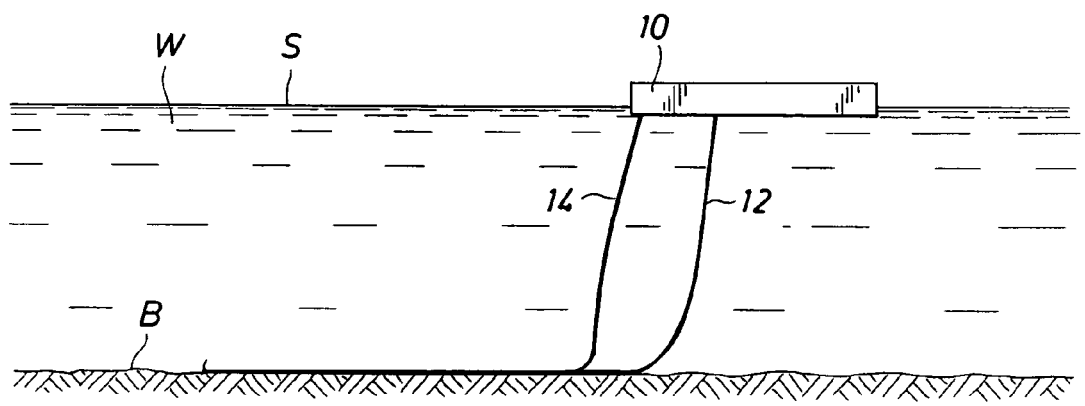
FIG. 1 is an elevation schematically showing a vessel floating in seawater with a first heavy pipe of steel or the like on the right of FIG. 1 suspended by the vessel or other support from the seawater's surface and forming a conventional catenary as it extends to a position on the seabed, and also for comparison, a lightweight pipe of this invention is shown on the left which is either buoyant or nearly buoyant when suspended in the same manner from the vessel or other support.

In FIG. 1 of the drawings, a vessel or platform 10 is provided for supporting a pipe 12 or 14 for "sweet" and "sour" service production, including export and injection services. Fluids transported include oil, gas, water and injection chemicals. The pipe 12 is a conventional pipe or umbilical made of steel and is non-buoyant. The offshore industry has spent millions of dollars to provide buoyancy to such conventional pipe because every unit of weight suspended in water requires buoyancy from a floating system, which in turn dictates the size and cost of the systems.

As also shown in FIG. 1, the pipe 14 is a lightweight flexible pipe which is entirely non-metallic or substantially non-metallic, and is buoyant when suspended as a catenary in seawater from the seawater surface S supported from a vessel or platform 10. Thus, as shown FIG. 1, the lightweight pipe tends to be unstable when affected by water currents or other forces usually in lateral directions. However, the buoyancy of the lightweight pipe when stabilized by adding weight has a major advantage of reducing or even eliminating the problems and costs of suspending heavy pipe in seawater for offshore operations.

Tubular composite non-metallic pipe has been disclosed per se in U.S. Pat. Nos. 5,261,462 and 5,435,867, but so far as known, such pipe has not been made in long lengths prior to the invention disclosed in U.S. Pat. No. 6,491,779 invented by Michael J. Bryant, where the flexible pipe is suspended from a vessel or platform to and along a seabed in a catenary configuration. Therefore, although the pipe disclosed by Donald H. Wolfe in the patents identified above may be considered "lightweight", it did not solve the problems of this invention. The flexible composite pipe of U.S. Pat. No. 6,491,779 invented by Michael J. Bryant and as used in this invention has solved the problem of the costs of supporting long lengths of pipe used in such catenary configurations for offshore operations. The term "lightweight pipe" as used herein means pipe made from composite, substantially non-metallic materials and in lengths which are long enough for deep subsea operations in which the pipe forms a catenary from the sea water surface to the seabed. This invention is especially suitable for use at deepwater depths of more than one-thousand feet When a lightweight pipe such as disclosed in U.S. Pat. No. 6,491,779 is suspended in a catenary configuration from the seawater's surface S, the pipe is normally lighter than the seawater when it transports gas and, in such case, which can be determined, for both the static and dynamic modes with known software, the pipe would float in an upward direction as schematically illustrated by pipe 14 in FIG. 1. If lightweight pipe is heavier than the seawater it will hang in a downward curve such as illustrated by the pipe 12 in FIG. 1.

To better stabilize the lightweight pipe in dynamic situations where sea currents and other forces act on the pipe, tension is created in the lightweight catenary by applying some weight to the pipe in proximity to the lower end of the pipe catenary.

Figure 2:
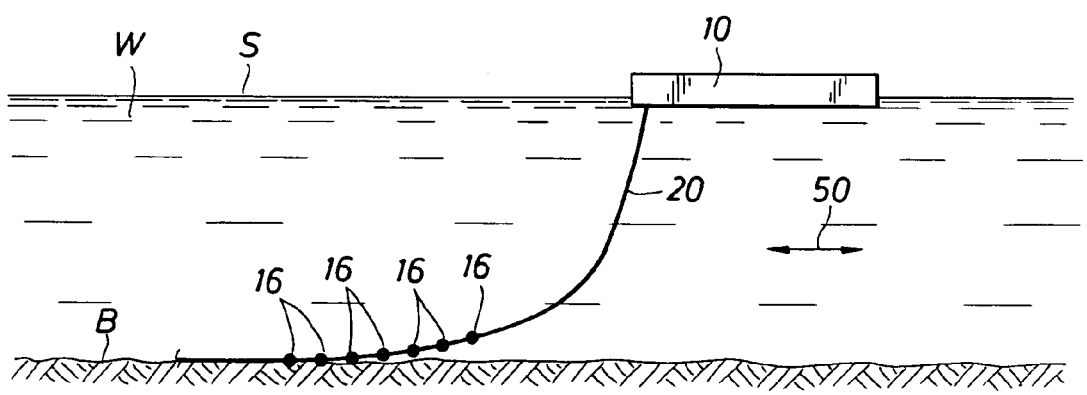
FIG. 2 is an elevation schematically showing the catenary configuration of the lightweight pipe to which some weight has been added to increase tension in the catenary to maintain the catenary as the seawater depth changes and the pipe is picked up and laid down on the seabed.

Weight may be added to the lightweight pipe to the extent determined to maintain it in a stable catenary configuration. For example, one or more weights 16 maybe distributed together or separately along the lower part of the pipe 20, near the portion of the pipe resting on the seabed, and/or preferably just above the seabed B. The weights are attached to the pipe 20 and then the pipe is lowered into the seawater W from the seawater's surface S to extend along the seabed B to terminals or other submerged equipment (not shown). Tension is created in the pipe 20 to achieve the catenary configuration such as shown in FIG. 2 of the drawings to stabilize the pipe during use in the seawater S.

Figure 3:
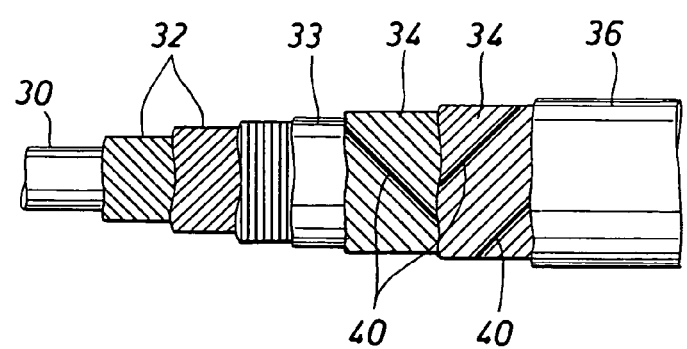
FIG. 3 is a partial elevation of an alternate form of the lightweight pipe in accordance with U.S. Pat. No. 6,491,779, and which has steel, lead or heavy filler material laid in with the helically wound non-metallic strands to provide weight to maintain the catenary configuration in the final position on the seabed.

FIG. 3 shows a portion of a lightweight pipe made in accordance with U.S. Pat. No. 6,491,779, which is incorporated herein, and which is essentially made of composite non-metallic components such as a tubular conductor 30, pressure and collapse reinforcements 32, a membrane extrusion 33, tensile reinforcements 34, and an outer jacket 36. To provide the weight for overcoming all or some of the tendency of the lightweight pipe to be buoyed upwardly or moved upwardly by currents 50 or other forces, steel, lead or heavy material 40 may be wires laid or formed helically with non-metallic strands 34 in the manufacturing process.

The foregoing disclosure and description of the invention are illustrative and explanatory thereof, and the various changes in the details of the illustrated apparatus and construction and method of manufacture may be made without departing from the spirit of the invention.

What is claimed is:

1. A lightweight catenary system comprising; (a) a lightweight flexible pipe which has an upward or nearly upward buoyancy when submerged in seawater forming a catenary configuration which hangs under tension in a downward curve in proximity to the seabed; and (b) some weight attached in proximity to the lower portion of the pipe, with the amount of weight being sufficient to provide resistance to floatation of the flexible pipe and with tension on the pipe to stabilize and maintain the catenary configuration caused by lateral displacement and other forces in the subsea.

2. The system of claim 1, wherein the lightweight flexible pipe is substantially entirely non-metallic.

3. The system of claim 1, wherein the weight is distributed along the lower portion of the pipe in proximity to the seabed.

4. The system of claim 1, wherein the weight is a metal wire laid in a helical wrap adjacent non metallic strands.

5. A system for maintaining a flexible pipe in a substantially stable catenary configuration when suspended in seawater, comprising:
    (a) suspending a flexible pipe having a positive or nearly positive buoyancy in a catenary configuration which hangs in tension in a downward curve in proximity to the seabed;
    (b) applying weight in proximity to the lower end of said catenary to provide sufficient resistance to floatation of the pipe to stabilize the catenary; and
    (c) maintaining the tension on the pipe to stabilize and maintain the catenary configuration from displacement by lateral and other forces in the subsea.

6. The system of claim 5 wherein the lightweight flexible pipe is substantially entirely non-metallic.

7. The system of claim 5, wherein the weight is distributed along the lower portion of the pipe in proximity to the seabed.

8. The system of claim 5, wherein the weight is a metal wire laid in a helical wrap adjacent nonmetallic strands.

9. A lightweight catenary system comprising:
    (a) a lightweight flexible pipe which has an upward or nearly upward buoyancy when submerged in seawater in a catenary configuration;
    (b) some weight attached in proximity to the lower portion of the pipe, with the amount of weight being sufficient to provide resistance to floatation of the flexible pipe to stabilize the catenary configuration;
    (c) wherein the weight is a metal wire laid in a helical wrap adjacent non metallic strands.

10. A system for maintaining a flexible pipe in a substantially stable catenary configuration when suspended in seawater, comprising:
    (a) suspending a flexible pipe having a positive or nearly positive buoyancy when disposed as a catenary in seawater;
    (b) applying weight in proximity to the lower end of said catenary to provide sufficient resistance to floatation of the pipe to stabilize the catenary;
    (c) wherein the weight is a metal wire laid in a helical wrap adjacent nonmetallic strands.

\* \* \* \* \*